Feb. 5, 1929.

H. E. BAKER 1,701,436

PUNCHING MECHANISM FOR USE WITH ADDING MACHINES

Filed Feb. 1, 1927    3 Sheets-Sheet 1

INVENTOR
H. E. BAKER
BY Laurie L. Witter
ATTORNEY

Feb. 5, 1929.
H. E. BAKER
1,701,436
PUNCHING MECHANISM FOR USE WITH ADDING MACHINES
Filed Feb. 1, 1927 3 Sheets-Sheet 2
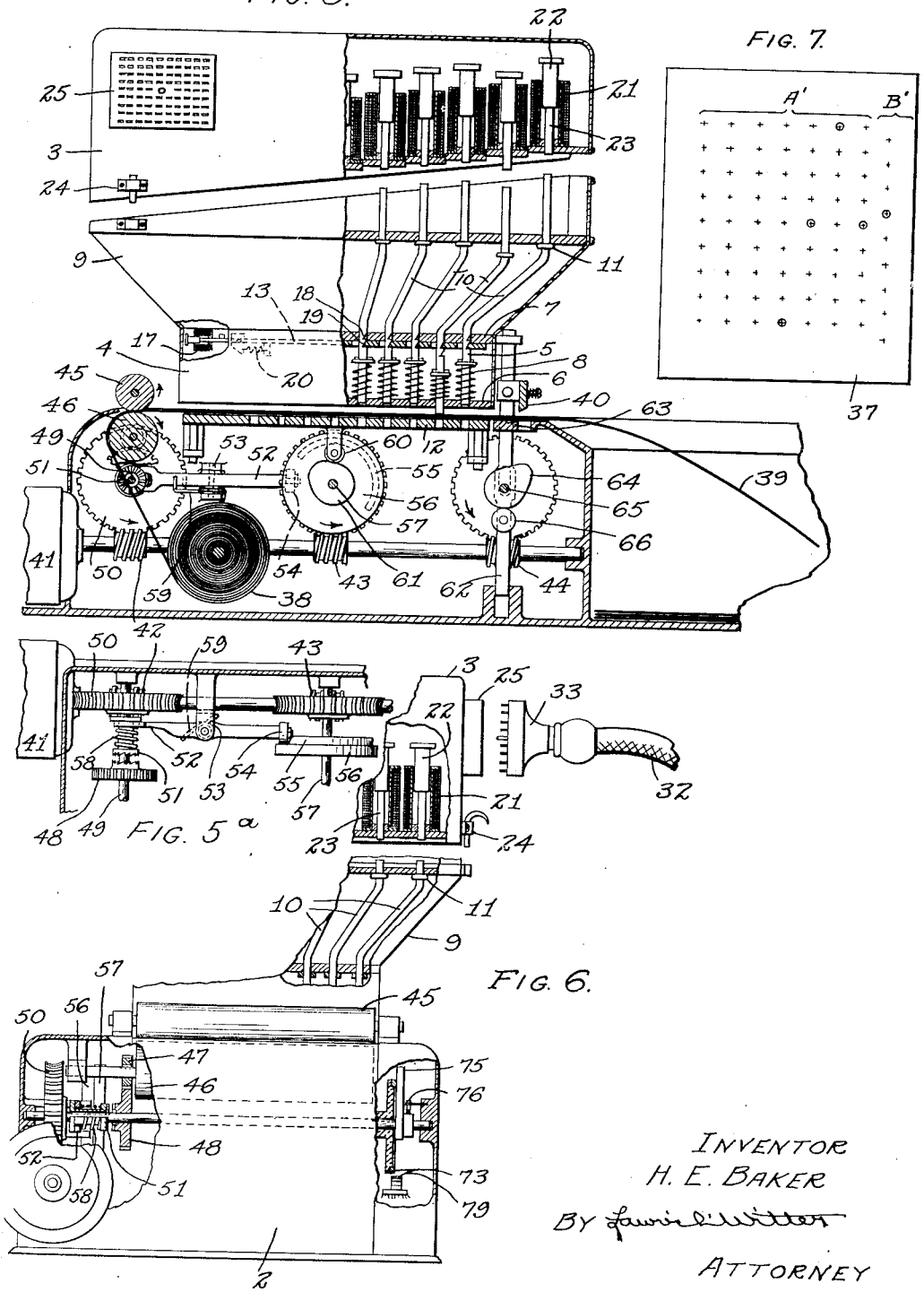
INVENTOR
H. E. BAKER
ATTORNEY Feb. 5, 1929.
H. E. BAKER
1,701,436
PUNCHING MECHANISM FOR USE WITH ADDING MACHINES
Filed Feb. 1, 1927   3 Sheets—Sheet 3
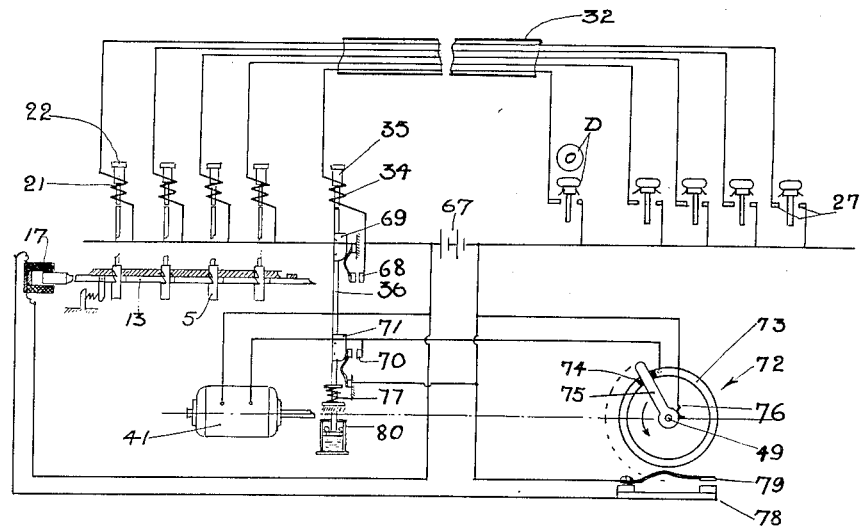
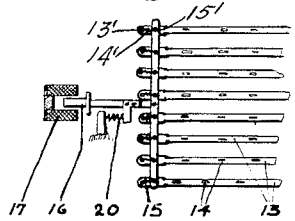
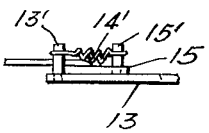
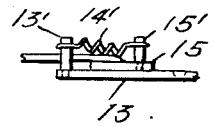
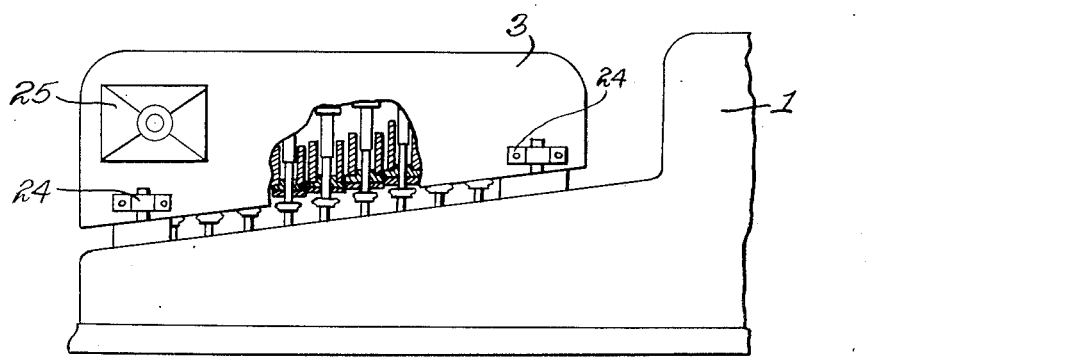
H. E. Baker, INVENTOR.
BY
ATTORNEY.

Patented Feb. 5, 1929.

1,701,436

UNITED STATES PATENT OFFICE.

HARRY E. BAKER, OF BOSTON, MASSACHUSETTS.

PUNCHING MECHANISM FOR USE WITH ADDING MACHINES.

Application filed February 1, 1927. Serial No. 165,196.

This invention relates to mechanism particularly adapted for use in connection with an adding machine for making a punched record of each item recorded by the adding machine, the invention being similar in some respects to that disclosed in a co-pending application, Serial No. 162,367 to L. W. Langford.

It is well known that a large part of the work done on adding machines comprises the recording and totaling of amounts in conjunction with the classification of the various items. Usually such amounts are first recorded with or without a classification number in order to secure a general total, which must later balance with the sum of the totals of the various classification groups. For this class of work adding machines with a permanent or variable split keyboard are frequently used. The classifying or descriptive numbers to the left of the split are usually not added but merely indicated on the item strip.

After the items have all been recorded and totaled on the adding machine strip it is then necessary, in most work of this character, to sort the items into their different classification groups and record each group on the adding machine in order to get these respective classification or group totals. For example, a bank is interested not only in the total number or amount of the checks passing through its hands but it is also necessary to secure various sub-totals of these checks, classified in accordance with various requirements. Again, a merchant desires to know not only the total of his sales but also the sub-total of each department, etc.

As in the above mentioned application, my invention herein proposes to make a punched record of each item listed by the adding machine by so connecting a punch-press with the adding machine that the former is automatically controlled and operated from the latter, the punchings indicating not only the amount of each item but also its classification. My improved construction herein, however, contemplates the embodying of means, including a plurality of switches connected to the punch-press, in the adding machine and controlled by the operation thereof in a manner automatically selecting the punches corresponding to the characters recorded by the adding machine and performing the punching operation in accordance with the selected punches when the adding machine is operated. The provision of a mechanism broadly embodying this combination is one object of my invention.

As a further object of my invention I contemplate such an arrangement of punch selecting and operating mechanism that the punches will not be selected nor depressed to the punching position until the adding machine is caused to function. Such an arrangement is advantageous over that wherein the punches are set simultaneously with the adding machine keys since, in my construction, errors made in depressing the wrong adding machine keys are corrected in the usual manner, i. e. merely by depressing the correct key, the wrong key thereupon automatically snapping back to its original position.

These punched records, which are thus obtained without the expense of any labor, may thereafter be used to automatically and mechanically secure lists and totals of the various groups. Machines which operate on punched records for this purpose are well known in the art and need no description herein. However, here again I propose and prefer to use the same adding machine to make up these lists automatically. This is done by running the various groups of punched records through a feeder, preferably automatic in operation, which is so connected to a solenoid keyboard superposed over the adding machine keyboard as to automatically operate the adding machine in accordance with the punched records. In this manner group lists of the various items, in accordance with their classification, are obtained and the sum of the totals thereof must check with the general total if no error has been made.

Another object of my invention herein is the provision of a detachable head adapted to be mounted either on the punch-press or adding machine, and carrying a plurality of solenoids so arranged as to cooperate with both the punches and adding machine keys. When making the punched records the head is used on the punch-press and when using the records to automatically control and operate the adding machine the head is used on the adding machine.

With the above and other objects in view, as will hereinafter appear, my invention consists in the features of construction and operation set forth in the following specification and illustrated in the accompanying drawings, it being understood, however, that the invention can be otherwise embodied and that the drawings are not to be construed as defining or limiting the scope of the invention, the claims appended hereto being relied upon for that purpose.

Referring to the figures of the drawings:

Fig. 5 is a side elevation, partly in section, of an automatically-operating punch-press adapted to be controlled from the adding machine.

Fig. 6 is an end elevation thereof.

Fig. 7 illustrates one of the punched records made by the punch-press.

Fig. 8 is a side elevation of the adding machine showing the detachable operating head mounted on the keyboard thereof.

Fig. 9 is a wiring diagram of the detachable head cooperating with the punch-press.

Fig. 10 is a detailed view of the punch holding and releasing mechanism.

Fig. 11 is a side view of the release bars shown in Fig. 10.

Fig. 12 is a like view showing one of the bars in another position.

Figure 1:
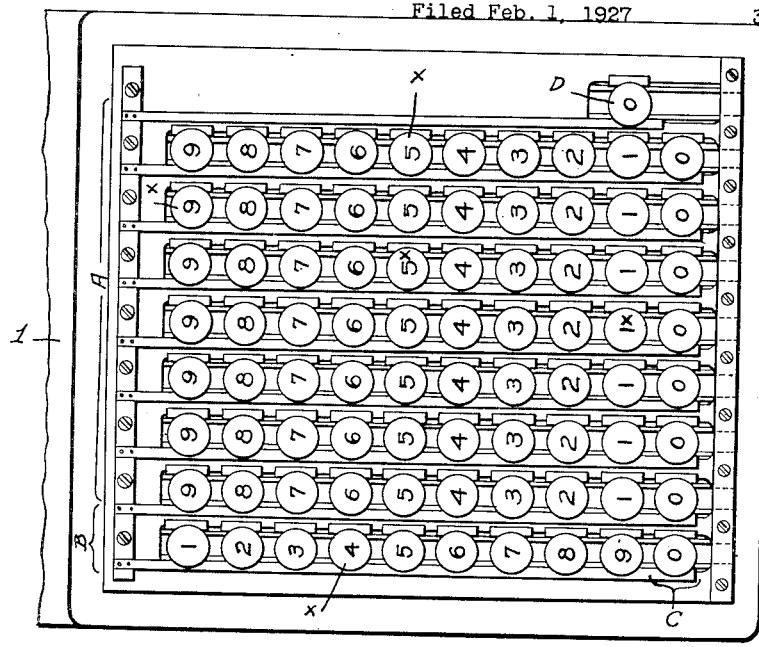
Fig. 1 is a plan view of an adding machine keyboard having a plurality of punch-press controlling switches embodied therein.

Briefly, the invention illustrated in the drawings comprises three main members, viz, an adding machine 1, a punch-press 2, and a detachable operating head 3 adapted to be used with either the adding machine or punch-press. The adding machine is operated in the usual manner and its operation automatically controls the punch-press, which thereupon makes a punched record of each item listed by the adding machine.

The adding machine illustrated has seven rows of amount-listing keys A, with nine keys in each row numbered 1 to 9 inclusive, and one row of classification keys B numbered 1 to 9, inclusive, in a reverse order. The bottom row of keys C are the usual correction keys adapted when depressed to release any of the keys above which may be in the depressed condition. The single key D is the operating key, the depressing of which causes the machine to function.

The punch-press 2 (Fig. 5) includes a fixed punch-head 4 having a plurality of punches 5, one for each of the amount and classification keys A and B. In the machine illustrated there are 63 amount keys A and nine classification keys B, and a corresponding number of punches 5. Each punch is guided in plates 6 and 7 and is normally held in raised position by a spring 8. A member 9 on the punch-head 4 carries a plurality of punch depressing elements 10, one for each punch. These elements may be formed as an integral extension of the punches or as separate elements superposed thereupon. The upward movement of the punches is limited by stops 11.

The punches are adapted to be set in depressed condition, in the manner hereinafter described, whereby as the movable die 12 is raised a punching is made by each set punch. As a means for holding the punches depressed or set I provide a plurality of bars 13, (Figs. 5 and 10) one for each of the eight rows of punches. Each of these bars is slotted at 14 to receive the punches therethrough. These bars are all connected to a crossbar 15 connected to the armature 16 of a solenoid 17. This connection is through springs 14' connected to pins 13' and 15' respectively on the bars 13 and plate 15. These springs permit individual movement of the bars 13 to the position illustrated in Fig. 12. Each punch has upper and lower notches 18 and 19 therein and into one of which the bar 13 is normally engaged by means of its spring 14' and a spring 20. When a punch is in the up position the bar engages in the lower notch 19. When the punch is depressed the bar snaps into the notch 18 and holds the punch depressed. When the solenoid 17 is energized the bars are all shifted against the action of the spring 20 in a manner releasing the set punches.

The detachable head 3 is of box-like form and carries a plurality of solenoids 21 therein, each provided with an armature 22 carrying a downwardly extending pin 23. The head is adapted to be mounted on either the punch-press or an adding machine 1 and to be held in place thereon by latches 24. The solenoids are so arranged that when the head is mounted on the punch-press the bottom ends of the pins 23 respectively cooperate with the top ends of the elements 10 and when mounted on the adding machine the pins cooperate in like manner with the adding machine keys. When thus arranged it will be obvious that the energizing of a solenoid will draw its armature downwardly and depress the corresponding punch or key. The solenoid terminals are all connected to a terminal board 25.

Figure 2:
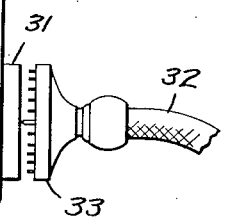
Fig. 2 is a side elevation thereof.
Figure 2:
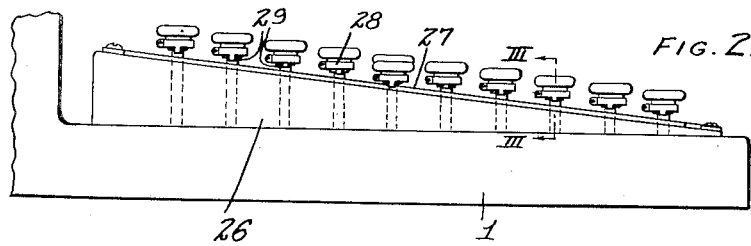
Figure 4:
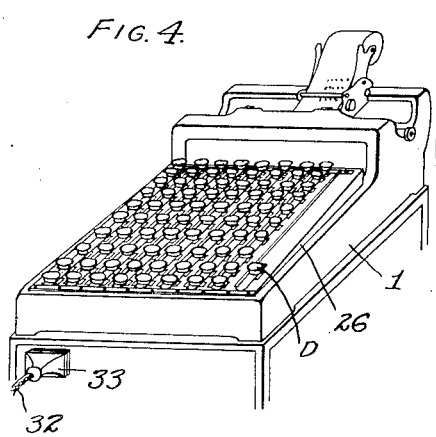
Fig. 4 is a perspective view of the adding machine.
Figure 3:
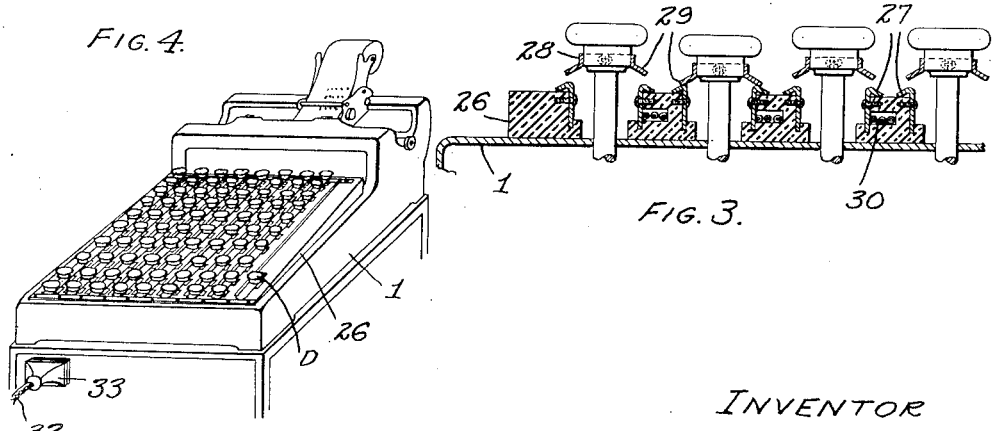
Fig. 3 is a fragmentary sectional view taken on line III—III of Fig. 2.

When the head 3 is mounted on the punch-press the solenoids 21 thereof are controlled by the adding machine. In the drawing herein I have illustrated a plurality of switches for thus controlling the solenoids and have shown these switches cooperating with the adding machine keys. Between the adding machine keys and beneath the buttons thereof I provide a plurality of strips 26 (Figs. 2 and 3) of insulating material. On these strips at opposite sides of each key I provide switch members 27 and cooperating with each pair of such members is a connecting band 28 on each button and having a pair of downwardly extending wings 29 adapted to engage and connect the pair of members 27 when the key is depressed. The members 27 are connected by wires 30 in the strips 26 to a terminal board 31 like the terminal board 25 on the punch-press.

The operating head 3 on the punch-press is adapted to be connected to the adding machine by a compound cable 32 having at each end thereof a connecting member 33 to fit the terminal boards 25 and 31. When the operating head and adding machine are thus connected each pair of switch terminals 27 on opposite side of a key is connected to the terminals of the solenoid of the corresponding punch. The switch terminals of the operating key D are likewise connected to the terminals of a solenoid 34 (Fig. 9) also carried in the head 3. The depressing of the key D is adapted to close its switch 27 and energize the solenoid 34, which thereupon draws its armature 35 downwardly and depresses a rod 36 in the punch-press, the function of this rod being hereinafter described.

The punched records 37 are preferably made from a continuous roll 38 of paper 39, which, after being fed to the punch-press and punched, is automatically cut off by a knife 40 to form independent tickets. Such a ticket is shown in Fig. 7, the punching positions being indicated by crosses. It will be noted that the sixty-three amount punches A' are set in nine rows of seven punches each and the nine classification punches B' are positioned in staggered relation to such rows. The sorting of the records is automatically controlled by the nine classification punchings and the purpose of staggering these with relation to the amount punchings is to avoid contact through the amount punch holes. Another punched hole may be provided for operating the auditing machine when using these punched records for that purpose, if desired, but ordinarily this operation may be controlled by the classification punching.

The punching, feeding, and cutting-off operations are all illustrated as being performed by an electric motor 41. The feeding, punching and cutting-off mechanisms are respectively driven by worms 42, 43, and 44 on the motor shaft.

The ticket forming paper extends upwardly from the continuous roll 38 between an idler roll 45 and a co-operating driven roll 46. A gear 47 (Fig. 6) on the driven roll shaft is in mesh with a gear 48 loose on a shaft 49. This shaft 49 is rotated by a worm gear 50 fixed thereon and in mesh with the worm 42 (Fig. 5). A clutch sleeve 51 is splined to the shaft 49 and the adjacent faces of this sleeve and the gear 48 are provided with very fine clutch teeth whereby the gear 48 is driven when the clutch is engaged therewith. An arm 52 pivoted at 53 has one end forked and engaging the clutch sleeve 51. A roller 54 on the other end of the arm is in the path of a cam 55 on a disc 56 on a shaft 57 driven by the worm 43. The cam 55 pivots the arm in a direction engaging the clutch sleeve with the gear 48, the engagement being cushioned through a spring 58. Therefore, while the cam 55 is beneath the roller 54 the clutch sleeve is engaged and the paper fed. These parts are so related that the paper is fed the length of one ticket at each rotation of the shaft 49. The arm 52 is normally held in the clutch disengaging position by a spring 59.

The die 12 is raised to perform the punching operation by means of a roller 60 beneath and connected to the die and riding on a cam 61 on the shaft 57. This shaft is driven at the same rate as the shaft 49 and raises the die once for each shaft rotation.

The knife 40 is carried on a pair of rods 62 and cooperates with a stationary knife 63. A pair of cams 64 on a shaft 65 driven from the worm 44 cooperates with rollers 66 on the rods 62. The arrangement is such that the rods and knife are drawn downwardly at each shaft rotation. This shaft is driven at the same rate as shafts 49 and 57.

The control of the punch-press from the adding machine and the automatic control thereof are illustrated diagrammatically in Fig. 9. As above stated, the solenoids 21 are connected to their respective adding machine key switch terminals 27 by a connecting cable 32. These connections are through a battery 67. When the adding machine keys are depressed they remain depressed with their switches 27 closed until the machine is operated. A switch 68 is, however, interposed in the circuit to the solenoids 21 and the solenoids are therefore not energized until this switch is closed. When the operator has depressed the proper adding machine keys he depresses the operating key D. This operation energizes the solenoid 34 and depresses the rod 36. A cam 69 on this rod thereupon closes the switch 68 and the solenoids 21 corresponding to the depressed adding machine keys are energized and depress and set the corresponding punches.

The depressing of the rod 36 also closes a switch 70 in the motor circuit by means of a cam 71, whereupon the motor starts. The operation of the motor is thereafter controlled by an automatic switch 72 operating in conjunction with the shaft 49. This switch comprises a circular contact plate 73 extending around the shaft 49 continuously except for an insulated gap 74. A contact arm 75 on the shaft 49 rides on the plate as the shaft rotates. One terminal of the motor is connected to the plate 73 and the other terminal is connected to the arm by means of a brush 76. The switch 70 is shunted across the motor terminal wires as seen in Fig. 9. When the motor is at rest and the parts occupy the positions shown in Fig. 5 the arm 75 is in contact with the gap 74. Closing of the switch 70 starts the motor, whereupon the arm immediately comes into contact with the plate 73 and thereby keeps the contact closed and the motor running until the arm again reaches the gap 74. The shafts 49, 57 and 65 have thereupon made one complete rotation. The rod 36 is normally held in the raised position by a spring 77.

In Fig. 9 is also illustrated an automatic switch whereby the set punches are released at the end of each punching operation. This switch comprises one fixed contact 78 connected to one terminal of the solenoid 17 and a cooperating movable contact 79 connected to the other terminal of the solenoid through the battery 67. As soon as the shaft 49 has completed the punching operation the arm 75 forces the contact 79 into engagement with the contact 78. The solenoid 17 is thereby energized and the bars 13 shifted in a manner releasing the set punches.

The operation of the mechanism illustrated and above described may be briefly defined as follows:

Assuming that the several parts of the entire mechanism are in the normal positions, generally illustrated in the drawings, the operator manipulates the adding machine by depressing the keys thereof in the usual manner. Assuming, for example, that the first item to be recorded is in classification 4 and for $15.95. The operator depresses the 4 key in the classification column B and the 1, 5, 9 and 5 keys in the four appropriate amount columns A, as indicated by $x$ in Fig. 1. The depressing of these keys closes their operating switches 27 but, because of the open switch at 68, the punches are not affected. Should the operator find that he has depressed a wrong key he need only depress the correct key in that column, the wrong key automatically snapping back to its normal position.

Assuming that the keys marked $x$ in Fig. 1 have been properly depresesd, the operator then depresses the operating key D. The adding machine thereupon functions in the usual manner to record the item. Depressing of the key D closes its switch 27 and energizes the solenoid 34 which thereupon forces the rod 36 downward. This operation closes the switch 68, whereupon the solenoids 21 corresponding to the depressed keys $x$ are energized and force their punches downward. Bars 13 immediately snap into the notches 19 and hold these punches depressed. It will, of course, be understood that in a hand operated adding machine the switch 27 of the operating key D would be located in a manner to be automatically closed by the movement of the operating handle in the same manner that the same is herein closed by the depressing of the operating key D.

The downward movement of the rod 36 also closes the switch 70 and starts the motor. The arm 75 immediately moves onto the contact 73 and maintains such contact for one complete rotation of the shaft 49, when the arm again engages the gap 74. It may be desirable to provide the rod 36 with a dashpot 80 for holding the rod depressed and the switch 70 closed long enough to move the arm 75 onto the contact 73.

By referring to Fig. 5 it will be seen that the first operation of the motor will move the die 12 upwardly to perform the punching operation, the cam 64 operating at the same time to draw the knife 40 downward and sever the previously punched ticket. Directly thereafter the arm 75 closes the switch 78—79 which energizes the solenoid 17 and automatically releases the set punches, which thereupon snap up to their normal position. By this time the cam 55 has reached the roller 54 and forced the clutch 51 into engagement with the gear 48. The feeding roll 46 is thereupon rotated to feed the paper 39 the length of one ticket, this feed being accurately regulated by the position and length of the cam 55. When this operation is completed the arm 75 has reached the gap 74 and the motor automatically stops, the shafts 49, 57 and 65 each having made one complete rotation. It will be understood that the several parts are left in their normal position (illustrated in Fig. 5) ready for receiving the next item from the adding machine.

When the listing on the adding machine is completed, in the manner above described, a punched ticket 37 has been automatically made for each item thereof. These tickets are then automatically sorted, by means of the classification punchings, into their respective classification groups, and each group run through a feeder (not illustrated) to obtain an itemized list of each such group. For this purpose the feeder is connected to the head 3 by the cable 32 and the head is mounted on the adding machine as shown in Fig. 8. As the tickets run through the feeder the amount punchings A' therein automatically cause the corresponding solenoids 21 to be energized and depress the corresponding keys. The classification punchings are so arranged that the same automatically cause the solenoid 35 to be energized, this solenoid being located over the operating key D and therefore automatically causing the adding machine to function for each item. The head 3 therefore serves the dual purpose of operating both the punch-press and adding machine.

I claim:

1. In combination with an adding machine, a punch-press having a plurality of punches, means for moving the punches to punch record blanks supplied thereto, and means controlled by the adding machine and including a plurality of switches in the adding machine and connections therefrom to the said punch moving means for automatically selecting the punches corresponding to the characters recorded by the adding machine and automatically performing the punching operation in accordance with the selected punches when the adding machine is operated.

2. In combination with an adding machine, a punch-press having a plurality of punches, means for moving the punches to punch record blanks supplied thereto, means beneath the buttons of the adding machine keys providing switches respectively cooperating, one with each of the keys, in a manner adapted to be closed when a key is depressed, connections therefrom to the said punch moving means for automatically selecting the punches corresponding to the characters recorded by the adding machine, and means controlled by the adding machine for automatically performing the punching operation in accordance with the selected punches when the adding machine is operated.

3. In combination with an adding machine, a punch-press having a plurality of punches and a cooperating die, means for moving the punches to punch record blanks supplied thereto, means including a plurality of switches in the adding machine and connections therefrom to the said punch moving means for automatically selecting the punches corresponding to the characters recorded by the adding machine and setting the same to the punching position, and means controlled by the adding machine for automatically performing the punching operation in accordance with the selected punches by causing a relative approaching movement between the punches and die when the adding machine is operated.

4. In combination with an adding machine, a punch-press having a plurality of punches, a solenoid cooperating with each punch, switches respectively cooperating one with each of a plurality of the adding machine keys in a manner adapted to be closed when a key is depressed, connections respectively between the corresponding solenoids and key switches, means for operating the adding machine, and a switch in the said connections adapted to be closed by the operating of the last named means in a manner completing such connections where the key switches are closed and depressing the corresponding punches by means of their solenoids.

5. In combination with an adding machine, a punch-press having a plurality of punches and a cooperating die, a solenoid cooperating with each punch, switches respectively cooperating one with each of a plurality of the adding machine keys in a manner adapted to be closed when a key is depressed, connections respectively between the corresponding solenoids and key switches, means for operating the adding machine, a switch in the said connections adapted to be closed by the operating of the last named means in a manner completing such connections where the key switches are closed and depressing the corresponding punches by means of their solenoids, an electric motor, mechanism operated by the motor for feeding record blanks through the punch-press between the punches and die, means whereby the said mechanism is started by the operating of the adding machine operating means, and means for automatically stopping said mechanism after a predetermined run.

6. In combination with an adding machine, a punch-press having a plurality of punches and a cooperating die, a solenoid cooperating with each punch, switches respectively cooperating one with each of a plurality of the adding machine keys in a manner adapted to be closed when a key is depressed, connections respectively between the corresponding solenoids and key switches, means for operating the adding machine, a switch in the said connections adapted to be closed by the operating of the last named means in a manner completing such connections where the key switches are closed and depressing the corresponding punches by means of their solenoids, means for holding the punches depressed, an electric motor, mechanism operated by the motor for causing a relative approaching movement between the die and punches to punch a record therebetween and for thereafter feeding the punched record from the machine and a new record into its place, means automatically releasing the set punches after the punching operation, means whereby the said mechanism is started by the operation of the adding machine operating means, and means for automatically stopping said mechanism after a predetermined run.

7. In combination, a punch-press having a plurality of punches, a removable head carrying a plurality of solenoids so arranged as to respectively depress the punches to punching position when the head is mounted on the punch-press and the solenoids energized, the construction of the head and its arrangement of solenoids also being such that the head can be mounted on the keyboard of an adding machine in a position adapting the solenoids to operate the keys thereof, and means providing solenoid-operating electrical connections from the head to the controlling means therefor.

8. In combination, a punch-press having a plurality of punches, a member mounted on the punch-press above the punches, a plurality of punch depressing elements carried by the member and respectively cooperating with the punches, a head carrying a plurality of solenoids so arranged as to respectively cooperate with and depress the said elements when the head is mounted on the said member and the solenoids energized, and means providing solenoid-operating electrical connections from the head to the controlling means therefor.

9. In combination with an adding machine, a punch-press having a plurality of punches, punch setting means cooperating with the punches, switches respectively cooperating one with each of a plurality of the adding machine keys in a manner adapted to be closed when a key is depressed, connections between the punch setting means and switches, means for causing the adding machine to function, and means automatically operated by the last named means to complete the said connections where the key switches are closed and thereby cause the corresponding punches to be set.

10. In combination with an adding machine, a punch-press having a plurality of punches and a cooperating die, means for moving the punches to a position adapted to punch record blanks supplied thereto, means including a plurality of switches in the adding machine and connections therefrom to the said punch moving means for automatically selecting the punches corresponding to the characters recorded by the adding machine and setting the same to the punching position, means for controlling the operation of the adding machine, a switch in the said connections adapted to be closed by the operation of the last named means in a manner completing such connections where the key switches are closed and thereby setting the corresponding punches, a power element, means operated thereby for feeding record blanks through the punch press between the punches and die and for causing a relative approaching movement between the punches and die to punch the blank therebetween, means whereby the last said means is caused to function by the means which controls the operation of the adding machine, and means for automatically releasing the set punches after the punching operation.

In testimony whereof I affix my signature.

HARRY E. BAKER.